United States Patent [19]

Kreij

[11] Patent Number: 4,498,285
[45] Date of Patent: Feb. 12, 1985

[54] GAS TURBINE PLANT WITH A FLUIDIZED BED COMBUSTION CHAMBER

[75] Inventor: Sven-Erik Kreij, Linköping, Sweden

[73] Assignee: Stal-Laval Turbin AB, Finspong, Sweden

[21] Appl. No.: 502,837

[22] Filed: Jun. 9, 1983

[30] Foreign Application Priority Data

Jun. 14, 1982 [SE] Sweden .................................. 8203664

[51] Int. Cl.³ .......................... F02G 3/00; F02C 3/20
[52] U.S. Cl. .................................... 60/39.1; 60/39.25; 60/39.464
[58] Field of Search ................ 60/262, 39.464, 39.12, 60/39.181, 39.182, 39.1, 39.25, 39.29, 39.5, 731; 122/4 D; 431/7, 170; 110/263; 137/888, 892

[56] References Cited

U.S. PATENT DOCUMENTS 4,281,510  8/1981  Borjesgard et al. ............. 60/39.464
4,315,400  2/1982  Cole et al. ...................... 60/39.464

Primary Examiner—Carlton R. Croyle
Assistant Examiner—Timothy S. Thorpe
Attorney, Agent, or Firm—Pollock, Vande Sande & Priddy

[57] ABSTRACT

A gas turbine plant includes a compressor and a turbine and therebetween a pressurized combustion chamber with a fluidized bed arranged within a pressurized container. The plant is also provided with valves for shutting off the compressor and the turbine from the combustion chamber upon a sudden load drop out and a valved by-pass duct for direct connection of the compressor and the turbine. To rapidly release the pressure in the combustion chamber when there is a direct connection between the compressor and the turbine, hot gas from the fluidized bed and colder compressed air from the container are mixed in a mixing chamber prior to discharge into the surroundings. In this way, the blow-off valve is protected from very hot gases which would damage it.

6 Claims, 4 Drawing Figures

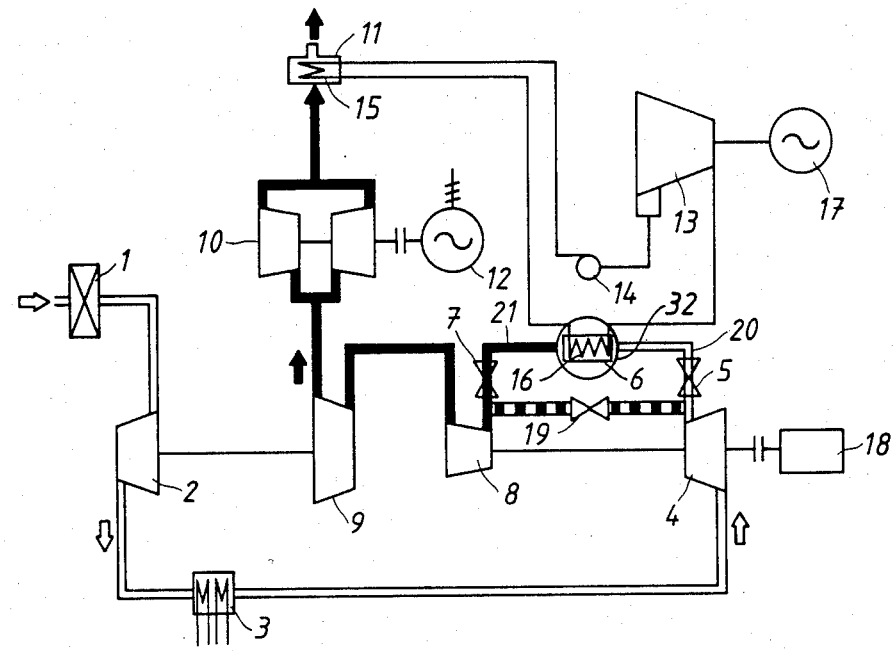
FIG. 1 (PRIOR ART)
FIG. 2
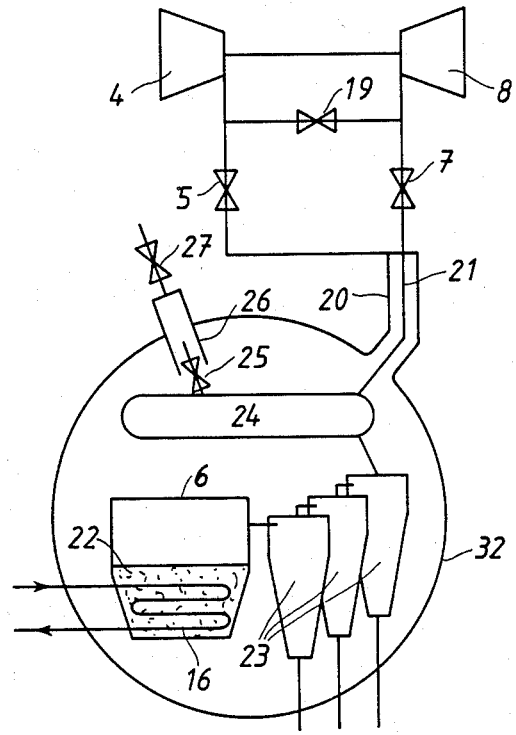

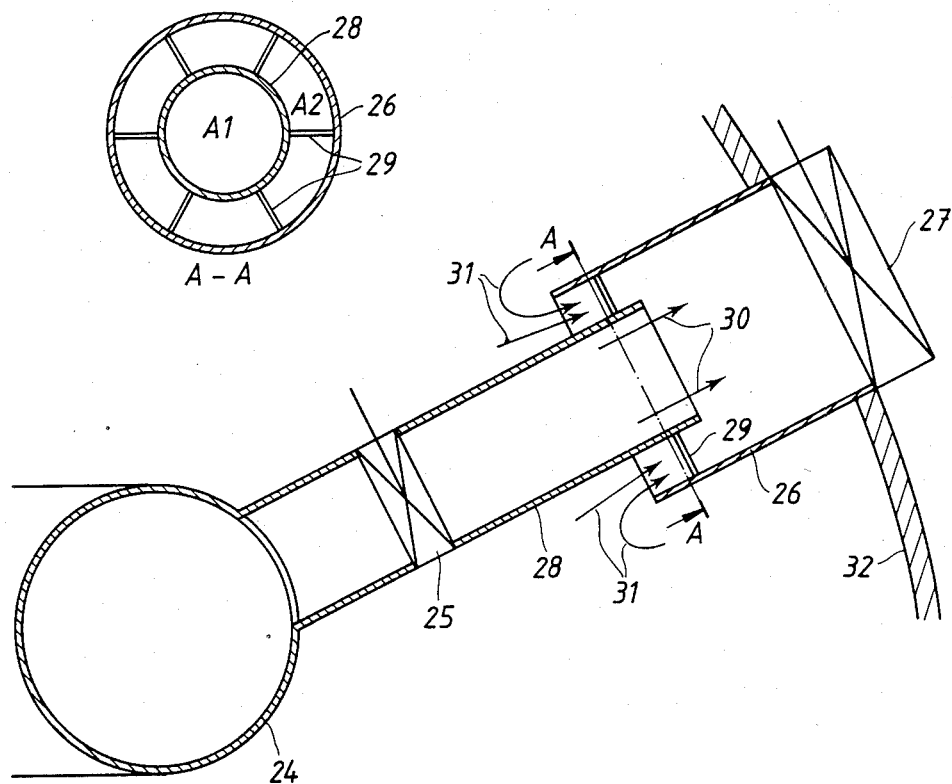

GAS TURBINE PLANT WITH A FLUIDIZED BED COMBUSTION CHAMBER

FIELD OF THE INVENTION

The present invention relates to a gas turbine plant which contains a fluidized bed interposed between a compressor and a turbine. The compressor feeds pressurized air to a container surrounding a combustion chamber from where it is fed to the fluidized bed. Fuel is burnt in the fluidized bed and the combustion products therefrom are fed to the turbine. When a sudden reduction in turbine load arises for any reason, the combustion chamber has to be isolated from the compressor and turbine (which are now directly connected together).

BACKGROUND OF THE INVENTION

Use of a fluidized bed combustion chamber has proved to be an advantage in the operation of gas turbines, since by using a pressurized fluidized bed it is possible to drive a gas turbine with many different kinds of fuel, among other things with solid fuels. However, such a combustion chamber, when at operating conditions, represents a substantial store of energy, and this energy store must be taken into consideration if rapid load drop outs on the turbine can arise, especially if a solid fuel is being used in the combustion chamber. During such load cut outs, the combustion chamber is by-passed and blocked off from the compressor and the turbine so that the supply of hot gas from the combustion chamber to the turbine ceases. At the same time the combustion chamber has to be reduced to zero power and possibly also relieved of pressure.

In this connection, there are in principle two different possibilities for tackling the problems posed by the now-redundant but still fully operational combustion chamber.

One possibility involves equalizing the pressure between the cold and hot sides of the combustion chamber, so that the fluidized bed collapses and, since the air supply thereto is stopped, so that the combustion within the bed also practically ceases. Thereafter, in many cases, the bed will be cooled by the cooling tubes passing through the bed, through which water, steam or gas flows. When a long drop out period is anticipated, the pressure in the combustion chamber should, at an early opportunity, be discharged to the surrounding environment in some way.

The other possibility is to allow combustion within the fluidized bed to continue after the fuel supply has been stopped, and to use the compressed air which remains in and around the combustion chamber to burn off the residual fuel that remains in the fluidized bed, the hot gases from the bed now being discharged to the surroundings.

Whichever method is chosen for dissipating the stored energy in the combustion chamber, it is most important not to choose a method which is something between these two methods, since this could lead to the development of large quantities of carbon monoxide which together with the compressed air remaining in the container surrounding the combustion chamber, could introduce a grave risk of an explosion occurring.

SUMMARY OF THE INVENTION

The present invention is an extension of the second of the two methods mentioned above, whereby according to the invention, a valve system is provided for letting down the pressure in the combustion chamber.

According to one aspect of the invention there is provided a gas turbine plant comprising a compressor, a turbine, and therebetween a pressurized combustion chamber with a fluidized bed, first and second valve means for shutting off, respectively, the compressor and the turbine from the combustion chamber, and a by-pass duct including a third valve means for direct connection of the compressor and the turbine upon a drop out of the turbine load, which is characterized in that a valve system is provided for blow off of the pressure in the combustion chamber, said valve system including means for mixing together hot combustion gas and colder compressed air from the combustion chamber during the blow off.

Using a plant in accordance with the invention, the residual fuel in the fluidized bed is burnt off while at the same time the hot gases from the fluidized bed are discharged to the surroundings after having been mixed with cold compressed air. This cooling of the gases prior to discharge is very important to protect the blow off valve which, in normal operation, is used to seal the combustion chamber against its substantial working pressure. If this valve were to be exposed to the hot combustion gases with no preceding cooling of those gases, the valve would very soon fail no matter how carefully it was designed.

According to a further development of the invention, the valve system comprises one valve for cold air and one valve for hot gases. The valve passing the hot gases may very well be degraded in use, but a measure of leakage occurring in the hot gas valve will not be significant in the further operation of the plant. In the first place, this valve will only be subjected to the pressure drop appearing across the fluidized bed (and any associated gas cleaning plant), and in the second place a minor leakage through this valve can be allowed for in the design of the plant provided it can be maintained within acceptable limits.

BRIEF DESCRIPTION OF THE DRAWINGS

One embodiment of turbine plant in accordance with the invention will now be described, by way of example, with reference to the accompanying drawings, in which FIG. 1 is a schematic diagram showing the principle of a prior art gas turbine plant, FIG. 2 shows the compressed air container and combustion chamber of the plant of FIG. 1 in more detail, with the combustion chamber having been provided with a valve system to provide a plant according to the invention, FIG. 3 shows the valve system of FIG. 2 on an enlarged scale, and FIG. 3A shows a section on the line A—A of FIG. 3.

DESCRIPTION OF PREFERRED EMBODIMENT

FIG. 1 shows a known embodiment of a gas turbine plant, in which the gas turbine side includes three turbines in series for driving high and low pressure compressors and a generator, while at the same time the plant is supplemented with a steam cycle which includes a steam turbine driving a second generator.

The gas turbine circuit starts with an air filter 1 upstream of a low pressure compressor 2. Compressed air from the compressor 2 passes through an intermediate cooler 3 to a high pressure compressor 4, the output side of which is connected through a valve 5 to a fluidized bed combustion chamber 6. Through a valve 7, the hot gases from the combustion chamber 6 pass to a high pressure turbine 8, and then, in turn, to a low pressure turbine 9, a power turbine 10, and a heat exchanger 11 before being discharged to a chimney (not shown). The power turbine 10 drives a generator 12. The plant has furthermore been provided with a steam circuit, comprising a steam turbine 13, from where condensate, by means of a pump 14, is fed to a tube coil 15 in the heat exchanger 11 and further to a boiler coil 16 in the combustion chamber 6 and from there back to the turbine 13 which drives a generator 17. In addition, FIG. 1 shows a starting motor 18 which can be used, on startup, to generate the high pressure required in the plant.

The multishaft embodiment of the plant shown in FIG. 1 is nowadays common in large plants. The steam circuit is then able to feed a turbine as shown, or it may be connected to some heating process. The essential point according to the invention is the fact that a compressor (4) and a turbine (8) are provided, respectively, upstream and downstream of a pressurized bed combustion chamber 6, preferably one designed for solid fuel operation.

On the occasion of a rapid load reduction on the plant, the combustion chamber 6 is short-circuited by means of a valve 19 while at the same time the combustion chamber 6 is blocked from the compressor 4 and the turbine 8 by means of the valves 5 and 7.

The problem to which this invention addresses itself is how to safely passivate the combustion chamber 6 with its mass of unburnt fuel and its high thermal and pressure energy reserves. This will now be explained in greater detail with reference to FIG. 2.

FIG. 2 shows the combustion chamber 6, the high pressure compressor 4, the high pressure turbine 8, the conduits 20 and 21 and the valves 5, 7 and 19. The combustion chamber 6 contains a fluidized bed 22 with the cooling coil 16. Combustion chamber 6, as well as cyclones 23 for cleaning the hot gas issuing from the bed 22, and a header 24 for collecting the combustion gas from the cyclones 23 are enclosed in a container 32 pressurized by combustion air. From the header 24 the hot gas conduit 21 leads to the turbine 8 through the valve 7. The hot gas conduit 21 is shown partially surrounded by the compressed air conduit 20.

As mentioned previously, the problem is to reduce the pressure in the combustion chamber 6 while at the same time allowing the residue to fuel in the fluidized bed 22 to be burnt off without risk of carbon monoxide forming.

The most natural thing to do, would be to connect the header 24 directly to the ambient atmosphere through a blow-off valve so that all the air that had to be lost from the container 32 surrounding the combustion chamber 6 in the depressurization would have to pass through the combustion chamber 6 and the cyclones 23. But the blow-off valve would then have to be designed to withstand the full temperature of the hot gases and thereafter be able to reliably seal the combustion chamber during the next start-up, to a pressure of the order of magnitude of from 15 to 20 bar. A valve that can reliably perform these functions is not available at present. It should, perhaps, be mentioned, that the container 32 may have a diameter of from 10 to 20 meters (it is usually spherical), and contains a large quantity of air. The blow-off valve must therefore have a diameter of half a meter or more in order to blow-off the large quantity of gas enclosed in the container 32 and the combustion chamber 6 in a relatively short time. It would thus involve formidable constructional and material problems to manufacture a valve which could withstand the mechanical and thermal stresses mentioned above.

According to the invention, the hot gas from the header 24 is mixed with cold compressed air from the container 32 in a mixing chamber 26 mounted on container 32, and the arrangement for achieving this is shown in more detail in FIGS. 3 and 3A.

From the header 24, the hot gas is led through a valve 25 into the mixing chamber 26. The valve 25 is mounted in a tube 28 having a smaller diameter than that of the mixing chamber 26. The chamber 26 is open in the inward direction towards the interior of the compressed air container 32. The mixing chamber 26 terminates in a larger valve 27 which leads out into the environment, possibly through a chimney with a silencer (not shown). In the mixing chamber 26, the hot gas from the header 24 (arrows 30) is mixed with colder compressed air from the interior of container 32 (arrows 31) so that the hot gas, which may have a temperature of 800°–900° C., is cooled down to, for example, about 300°–400° C. This is a temperature that the valve 27 can withstand if only it is constructed from relatively good heat resistant materials.

The temperature of the gas arriving at the valve 27 can be controlled primarily by selecting a suitable relationship between the diameters of the mixing chamber 26 and the tube 28. The ratio of the cross-sectional areas A1 (of the tube 28) and A2 (of the annulus between the chamber 26 and the tube 28) provide the required proportion of volumes of hot and cold air for the mixing in the chamber 26. However, it must be borne in mind that the pressure of the hot gas is lower than the pressure of the compressed air in the container 32 for the combustion chamber due to the pressure drop which arises when the air traverses the fluidized bed and the cyclones. The tube 28 can (as shown in FIGS. 3 and 3A) be supported within the open end of the chamber 26 by radial support arms 29 and the extent to which these will obstruct the annulus A2 will affect the mixing ratio. Means for controlling the opening of the valves 25 and 27 can be provided, which means is arranged to ensure a sufficient flow of air through the fluidized bed to effect fluidization of the bed and the complete combustion of the residual fuel therein.

From the foregoing it will be clear that the valve 25 will be traversed by unmixed hot gas, and therefore it must be anticipated that this valve will leak when closed during normal operation of the plant. However, this is of minor importance, since in operation the valve 25 will only be subjected to the pressure drop which arises across the fluidized bed and the cyclones. In addition, such limited leakage as will occur across the valve 25 can be taken into consideration in a relatively simple manner both during initial design of the plant and during its operation.

FIG. 2 shows the mixing chamber 26 mounted in the wall of the container 32 remote from the conduits 20 and 21. Another possibility would be to connect the chamber 26 to the upper end of the compressed air conduit 20 so that the valve 25 with the tube 28 communicates with the hot gas conduit 21. This arrangement would ensure a certain measure of heat exchange along this conduit between the hot and cold gases prior to mixing. What location of the mixing chamber is preferable depends on local conditions existing at each particular plant and cannot be generalized.

Carbon monoxide formation, during the dying stages of combustion in the fluidized bed 22, can be avoided by ensuring that an adequate supply of air passes through the bed until combustion of the residual fuel has ceased. Control of the air flow through the bed to achieve this end can be effected by conventional means.

The drawings show specific arrangements within the scope of the invention and these should be taken as examples which do not limit the invention. Various modifications are possible to the arrangements described and illustrated above within the scope of the following claims.

What is claimed is:

1. A gas turbine plant comprising
   a compressor,
   a turbine,
   a combustion chamber for a fluidized bed between said compressor and said turbine and enclosed in a pressure container,
   means for providing pressurized combustion air from said compressor to said pressure container,
   inlet means for providing pressurized combustion air from said pressure container to said combustion chamber,
   first and second shut-off valve means for shutting off, respectively, the compressor and the turbine from the combustion chamber, and a by-pass duct including a third valve means for direct connection of the compressor and the turbine upon a drop out of the turbine load,
   a valve system for blow off of combustion gas from the combustion chamber upon a drop out of the turbine load, said valve system including means for mixing together hot combustion gas and colder compressed air from said pressure container during the blow off.

2. A gas turbine plant according to claim 1, in which said valve system comprises a first blow-off valve which connects said pressure container surrounding the combustion chamber with the surroundings, and a second blow-off valve which connects a hot outlet side of the combustion chamber with the interior of said pressure container.

3. A gas turbine plant according to claim 2, in which said first blow-off valve is positioned on the outside of a mixing chamber located in the wall of said pressure container and open towards the interior of the container, and in which said second blow-off valve opens out into said mixing chamber.

4. In a gas turbine plant having a gas turbine, a combustion chamber in a pressure container, means to feed pressurized air to said pressure container, bed means for providing a fluidized bed within the combustion chamber, an inlet to said bed means opening to pressurized air within said pressure container, an outlet of said bed means, and duct means for hot gas which connects said outlet of said bed means with said gas turbine,
   the improvement comprising:
   valve means in said duct means for letting down the pressure in said combustion chamber, said valve means including means for mixing a proportion of hot gas from said combustion chamber with cold pressurized air from said pressure container before allowing said mixture to exit to the atmosphere.

5. A plant as claimed in claim 4, in which said duct means for hot gas includes gas cleaning equipment within said pressure container and said valve means includes a mixing chamber within said pressure container, and a valve downstream of the gas cleaning equipment opening said duct means into said mixing chamber on the occasion of a pressure let-down.

6. A plant as claimed in claim 5, in which said duct means for hot gas from the combustion chamber includes a header downstream of the gas cleaning equipment but upstream of said valve.

* * * * *